United States Patent

[11] 3,578,380

| [72] | Inventor | Rosalind R. Jacobus<br>1730 Gumwood Drive, Concord, Calif. 94520 |
|---|---|---|
| [21] | Appl. No. | 805,194 |
| [22] | Filed | Mar. 7, 1969 |
| [45] | Patented | May 11, 1971 |

[54] SANITARY COVER FOR SHOPPING CART SEAT
6 Claims, 7 Drawing Figs.

[52] U.S. Cl. ..................................................... 297/229
[51] Int. Cl. ..................................................... A47c 4/30
[50] Field of Search ........................................... 297/229,
274, 275, 218, 219, 225, 228, 250, 254, 255, 390, 457

[56] References Cited
UNITED STATES PATENTS

| 1,265,126 | 5/1918 | Silver | 297/274 |
| 1,861,455 | 6/1932 | Schwartz | 297/229 |
| 2,168,513 | 8/1939 | Cobb | 297/390 |
| 2,254,466 | 9/1941 | Albert | 297/228 |
| 2,662,775 | 12/1953 | Goldman | 297/250 |
| 2,755,841 | 7/1956 | Reinholz | 297/457 |
| 2,788,054 | 4/1957 | Erickson | 297/390 |
| 2,797,743 | 7/1957 | Rodtz | 297/229 |
| 2,979,121 | 4/1961 | Gates | 297/255 |
| 3,065,991 | 11/1962 | Finucane | 297/229 |

*Primary Examiner*—Francis K. Zugel
*Attorney*—Gregg & Hendricson

ABSTRACT: A thin sheet of pliable material configured to removably fit the seat of a conventional shopping cart in covering relation to all cart surfaces forming a portion of and adjacent to such seat. The sheet is formed of a double back portion slidable onto the back of a shopping cart seat, a central portion fitting the sides, bottom and front of the seat with openings in the front to match the cart seat openings and an edge portion disposable over the top cart bars and handle with elastic or tie means for securing the cover in position.

PATENTED MAY 11 1971

INVENTOR
ROSALIND R. JACOBUS
By Gregg & Henderson
ATTORNEYS

PATENTED MAY 11 1971 3,578,380
SHEET 2 OF 2
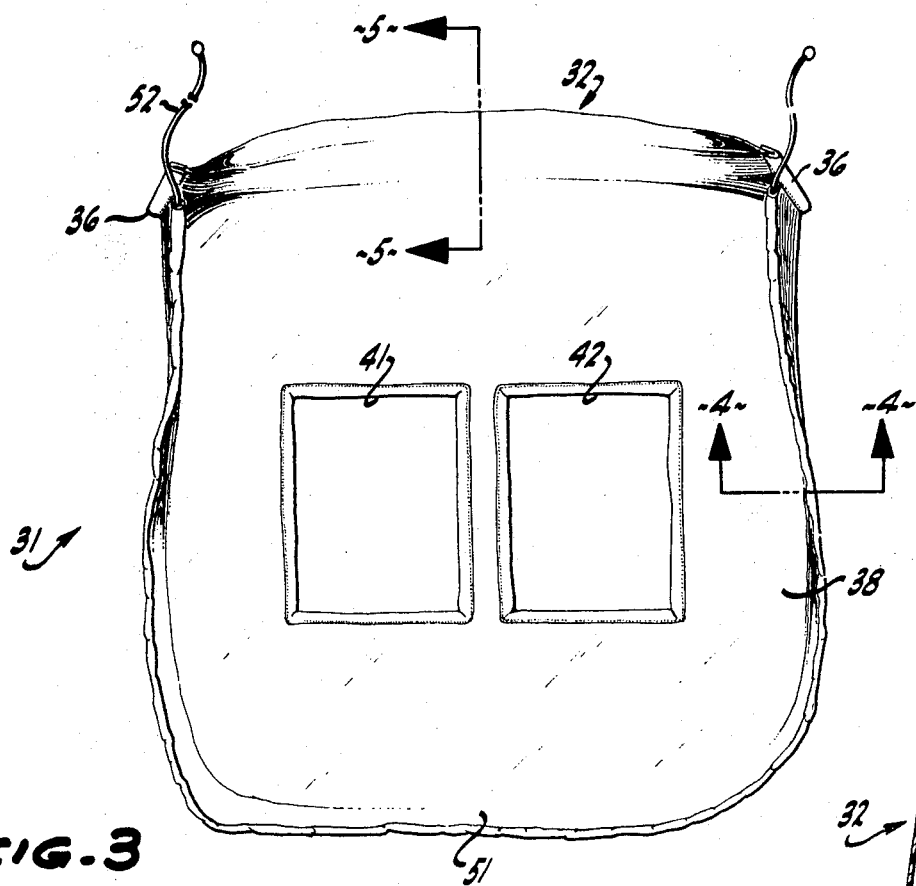
FIG.3
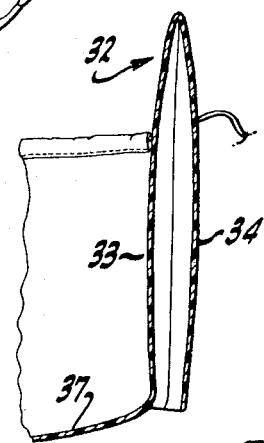
FIG.5
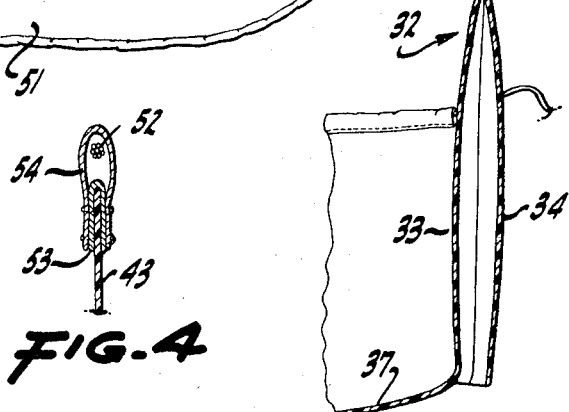
FIG.4
FIG.6
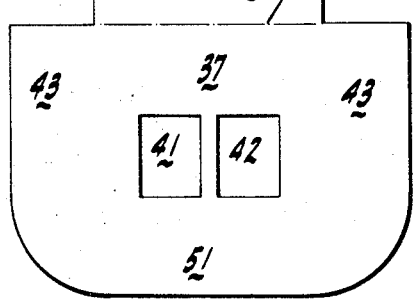
FIG.7
INVENTOR
ROSALIND R. JACOBUS
BY Gregg & Hendricson
ATTORNEYS 3,578,380

SANITARY COVER FOR SHOPPING CART SEAT

BACKGROUND OF INVENTION

Although there are various types of what may be termed shopping carts it is relatively conventional in supermarkets, grocery stores and the like to employ a cart somewhat of the type illustrated in U.S. Pat. No. 2,890,057 and to provide a baby seat therein as also illustrated in such patent. This or some other type of seat is usually provided in telescoping arrangement so that it may be folded out to receive a baby or small child in the cart so that it may be moved about with the cart as the parent is shopping. The convenience of a baby seat in a shopping cart is generally accepted, however, the sanitary aspects of same are generally overlooked. A baby placed in such a seat normally faces the rear bar or handle by means of which the cart is pushed and thus readily reaches this handle as well as the top side cart members with either hands or mouth. The perpencity of very small children to at least handle and feel elements or structures in close proximity to the child is well known and thus it at least often times results that the child does handle the shopping cart handle and bars and may even suck on these. It is manifestly impossible for the operator or manager of a store having a large number of shopping carts to continually clean them and particularly the shopping cart handles are subject to gripping by large numbers of persons of varying degrees of cleanliness. This then allows a small child or baby placed in a shopping cart seat to come in intimate contact with pieces of metal handled by the general public. Most certainly this is an unsanitary condition and one to be avoided if possible. The present invention does present a solution to this problem by the provision of an inexpensive cover for a shopping cart seat which may be readily and rapidly installed by a user of the cart to completely isolate the child from contact with cart surfaces. The cover may be formed of lightweight inexpensive material such as a plastic, so as to be disposable even after a single use.

It is recognized that an almost innumerable number of different kinds of seat covers have been previously designed. An early example of a seat cover is to be found in U.S. Pat. No. 1,213,511 pertaining to a removable cover particularly adapted for railway coaches. An early automobile seat cover is shown in U.S. Pat. No. 1,781,034. A more recent U.S. Pat. No. 2,736,364 shows a baby seat having a removable cover, however, prior art seat covers and the like are not adapted for use with shopping cart seats nor are they configured to provide full isolation of the occupant from a cart or the like upon which they are employed. The present invention does have these capabilities so as to provide a truly practical sanitary cover for shopping cart seats.

DESCRIPTION OF FIGURES

One preferred embodiment of the present invention is illustrated in the accompanying drawings wherein:

FIG. 3 is a plan view of a sanitary cover in accordance with the present invention before placement upon a cart seat;

FIG. 4 is a sectional view in plane 4—4 of FIG. 3;

FIG. 5 is a sectional view in plane 5—5 of FIG. 3;

FIG. 6 is a sectional view in plane 6—6 of FIG. 1; and

FIG. 7 is a plan layout of the sheet of the cover hereof before joinder of portions thereof together.

DESCRIPTION OF PREFERRED EMBODIMENT

Figure 1:
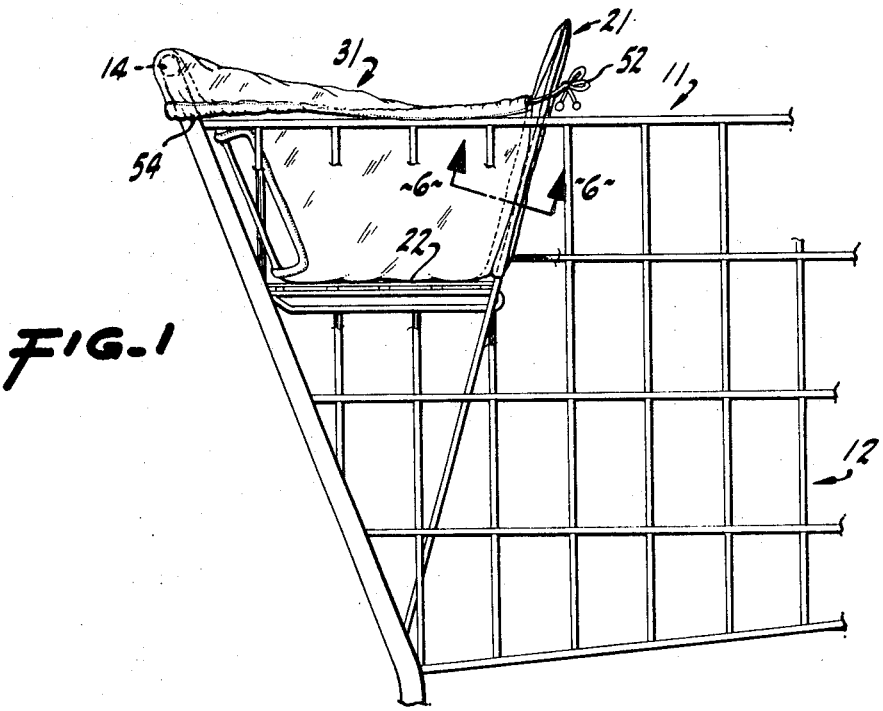
FIG. 1 is a side elevational view of a shopping cart seat with the sanitary cover of the present invention in place thereon.
Figure 2:
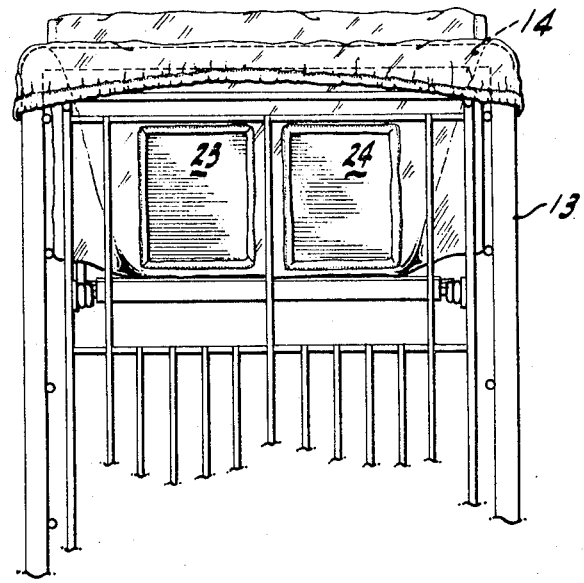
FIG. 2 is a partial rear elevational view of a shopping cart and seat with the sanitary cover of the present invention in place thereon.

The sanitary cover for shopping cart seats is generally illustrated both as to configuration and application in FIGS. 1 to 3 of the drawings. It is first noted that the present invention is not limited to a particular shopping cart seat structure, for minor variations may be made therein to accommodate other cart seat configurations while retaining the salient features of the present invention. For purposes of illustration there are shown in FIGS. 1 and 2 a type of shopping cart seat which may be pivoted between open and closed positions and upon which the cover hereof is mounted. It is, of course, to be understood that the cover hereof may also be employed with fixed shopping cart seats. As shown in FIGS. 1 and 2, a cart 11 may be formed with a basket 12 with somewhat of a U-shaped rear structural member 13 having the intermediate portion thereof forming a cart handle 14. The basket is shown to be mounted in forward extension upon this rear structural member 13 and the basket may be formed as a mesh of bars with the top horizontal bar 16 thereof joined to the rear structural member 13 below the handle 14. Of course, this handle portion may extend further rearwardly of the cart then illustrated.

This seat itself may, as shown in FIG. 1, be formed by an inclined back 21, which may, for example, be connected at the bottom to the rear structural member 13 or possibly to a bar therebetween at the bottom of the basket, and a flat bottom plate 22. The bottom plate 22 extends between the seat back 21 and the rear of the cart basket at the structural member 13 and in some instances is mounted so that the entire seat may be collapsed back against the rear of the basket. Inasmuch as this forms no part of the present invention further details thereof are omitted herein. It is, however, noted that the rear of the basket at the top is provided with two openings 23 and 24 immediately above the seat bottom 22 to accommodate extension therethrough of the legs of an infant placed in the seat.

The sanitary cover 31 is formed of a lightweight, pliable sheet of material such as plastic or the like. The cover, as variously illustrated in the separate figures of the drawings, comprises a double back portion 32 having inner and outer parts 33 and 34 which may in fact comprise a single piece of the sheet folded at the top, as best seen in FIG. 5, and open at the bottom. The inner and outer parts 33 and 34 of the back portion 32 are joined together along the sides thereof, as for example by binding 36 or other suitable joinder means such as heat sealing or the like. The cover also includes a bottom portion 37 which is preferably integral with the inner part 33 of the back portion, again as illustrated in FIG. 5. This bottom portion 37 extends forwardly from the back to form a front portion 38 which in FIG. 3 is shown as a flat continuation of the bottom portion because the cover is laid out flat rather than being turned up as would normally be the case when same is installed. This front portion 38 is provided two openings 41 and 42 which are located on the cover to substantially mate with the openings 23 and 24 in the backwall of the cart basket, as shown in FIG. 2. The cover is furthermore provided with side portions 43 integral with the bottom and front portions as lateral extensions thereof and folded upwardly into engagement with the back portion 32 along the side edges 36 thereof. A sectional view of one possible joinder of sides and back is shown in FIG. 6. As shown in such illustration, the outer edges of the inner and outer back parts 33 and 34 are placed together and the vertical edge of the side portion 43 is placed thereagainst and in alignment therewith. A tape or some other type of binding 36 may then be folded over this triple edge and sewn through along the length of the edge, as generally indicated at 44. As noted above alternative types of joinder may be employed such as, for example, pressing the edges together and applying heat thereto to "weld" the plastic together.

In addition to the above-identified portions of the cover hereof there is also provided a rim portion or front lip 51 integral with the sides and front portion and extending forwardly from the front portion. This completes the plastic extent of the cover but there is further provided along the upper edge of the sides 43 and the outer edge of the rim 51 means for drawing the rim about the handle of the shopping cart. Such means may comprise, for example, a drawstring as illustrated, or elastic. In the illustrated embodiment of the invention there is shown a drawstring 52 which extends as a single piece from one side of the back of 32 along the top edge of one side 43 and about the edge of the rim 51 and back along the top edge of the other side 43 to the other edge of the back. Again for purposes of illustration only, there is shown in FIG. 5 a manner of engaging this drawstring with the remainder of the cover. The section of FIG. 4 is taken at the side 43 of the cover and this side is shown to have a binding 53 along the top edge thereof with an outer binding 54 over same and extending upwardly therefrom to define a space within which the drawstring 52 is located. It is believed apparent that various alternative means of drawstring engagement are possible.

Considering now the application of the cover to a shopping cart seat, and referring to FIGS. 1 and 2, it will be seen that the back 32 of the cover, which has a double thickness and is open at the bottom thereof, is slipped over the seat back 21. This then places the bottom portion 37 of the cover upon the flat seat bottom 22 and the front portion 38 of the cover against the back of the basket. The rim or front lip 51 of the cover is then extended over the cart handle 14, as shown in FIGS. 1 and 2. The cover sides 43 have a sufficient height that the top edges thereof are slightly above the top bar 16 of the basket 11 and the length of the rim or front lip 51 is made sufficient so that, when extended over the handle, the front edge thereof will extend down below the level of the top basket bar 16. With the cover in position, as illustrated in FIGS. 1 and 2, the drawstring 52 is then tightened from the back of the seat to extend across the back and pull the edge of the rim or front lip 51 tightly against the structural member 13 below the handle 14. The drawstring may then be tied together behind the seat back to hold the cover in illustrated position. The openings 41 and 42 of the cover are generally aligned with the openings 23 and 24 in the back of the cart basket so that an infant may be placed in the seat with the infant's legs extending through these openings. It will be seen that the cover substantially and entirely isolates the infant from the shopping cart as well as any portions of the seat thereof. In particular, the handle 14 and top bar 16 of the cart basket are covered as well as the seat back and bottom and cart sides and back at the seat. This then prevents a small child or baby from handling the cart or seat or from placing its mouth against any portion thereof. Consequently the present invention does accomplish the objective of sanitizing a shopping cart seat for infants as the normal collection of grime, dirt and the like which collects upon shopping cart handles and other portions from continued handling by the general public cannot be contacted by the infant in the seat.

It is to be appreciated, as noted above, that the drawstring 51 of the illustrated embodiment of the invention may be replaced by elastic joined to the sides and rim about the outer edges thereof and also joined to the back portion of the cover at the top of the sides thereat. In the event that elastic is employed it should be remembered that the unstretched length thereof is to be somewhat less than the length of the outer edge of the cover from one side of the back to the other in the position of the cover illustrated in FIGS. 1 and 2. Thus the elastic would actually be stretched to move the rim or outer lip 51 over the handle. It is to be further noted that the cover of the present invention is actually formed of a single sheet of material such as illustrated in FIG. 7. In this figure the sheet is shown lying flat before joinder of any portions thereof. The inner and outer back portion 33 and 34 will be seen to extend upwardly in the view with the side portions 43 extending laterally outward from the lower part of the sheet. The rim or front lip 51 can be clearly seen in this view to comprise a forward extension of the bottom 38 and to the integral with the sides 43. In fabrication of the cover the entire back portion 32, extending somewhat as a large tab from the somewhat hemispherical remainder of the sheet, is folded upwardly from the plane of FIG. 7 along the fold line 61 and the outer portion 34 of the back is folded 180° back down along the fold line 62. The sides 43 are then folded upwardly from the plane of the figure to place the back edges thereof against the now upright edges of the back portions 33 and 34. The aforementioned edges are then joined together by any suitable means of permanent joinder and some tightening means is then engaged about the outer edges of the sides 43 and across the rim 51. These tightening means may, as noted above, comprise a drawstring, for example, or elastic or any other means suitable for drawing the rim toward the back and holding it there.

The simplicity of structure of the present invention particularly commends it to widespread utilization. An extremely inexpensive sanitary cover may be formed in accordance with the present invention so that in fact such cover is indeed truly disposable. It is, of course, possible to form the cover out of material other than plastic such as, for example, paper which may be suitably formed or treated to provide requisite strength and at least limited waterproofness. This latter requirement is inserted because of the known propensity of infants to mouth articles within their reach however, it is, of course, not absolutely necessary, for the limited time an infant would normally be in a shopping cart seat should preclude difficulties that might otherwise arise from deposition of moisture on the cover so as to reduce the strength thereof.

Although the present invention has been described with respect to a particular preferred embodiment thereof, it will be appreciated that such embodiment is only illustrative and various changes and modifications are possible, as for example as noted above. Reference is made to the following claims for a proper definition of the scope of this invention.

I claim:

1. A sanitary cover for shopping cart seats comprising a thin sheet of pliable material formed with a central bottom portion having a double layer back portion extending therefrom and open at the bottom thereof, said sheet having side portions extending laterally from said central portion and secured to said back portion along the contiguous edges of the two layers of said back portion, said sheet also having a front lip extending from said central portion on the opposite end of the latter from said back portion; and tightening means extending about the outer edges of said sides and said front lip from opposite sides of said back portion for engaging the cover with a shopping cart seat with said lip held over a handle of the shopping cart.

2. The cover of claim 1 further defined by said center portion, back portion, sides and front lip being integral.

3. The cover of claim 1 further defined by said tightening means comprising a drawstring extending along said side edges and front lip edge from opposite sides of said back portion for tying of the free ends behind said back portion to draw the lip edge toward the back portion and hold same in such position.

4. The cover of claim 1 further defined by said tightening means comprising elastic extending from opposite sides of said back portion in connection with the upper side edges and outer rim edge for drawing the rim edge toward the back portion.

5. The cover of claim 1 further defined by the lateral width of said back portion being dimensioned to slip the open bottom of the back portion over a cart seat back with the back portion enveloping same, and said central portion including a bottom portion contiguous with said back portion and a front portion extending forwardly from said bottom portion with leg openings therethrough.

6. The cover of claim 1 further defined by said side portions having a depth slightly greater than a cart seat depth whereby the upper side edges fold over the top of cart seat sides.